United States Patent [19]

Moshofsky

[11] Patent Number: 4,991,536
[45] Date of Patent: Feb. 12, 1991

[54] MARKER FOR BURIED OBJECTS

[75] Inventor: Jerome F. Moshofsky, Portland, Oreg.

[73] Assignee: Epic Corporation, Portland, Oreg.

[21] Appl. No.: 454,935

[22] Filed: Dec. 22, 1989

[51] Int. Cl.⁵ ............................................ G01D 21/00
[52] U.S. Cl. .................................. 116/209; 24/16 PB
[58] Field of Search ............... 116/209, DIG. 14; 52/103, 105; 24/16 PB, 30.5 P; 248/60; 405/157; 138/104

[56] References Cited

U.S. PATENT DOCUMENTS 3,403,430 10/1968 Steinborn ........................ 24/16 PB

FOREIGN PATENT DOCUMENTS 141127 4/1920 United Kingdom ............. 24/16 PB
698696 10/1953 United Kingdom ................. 248/60

Primary Examiner—William A. Cuchlinski, Jr.
Assistant Examiner—W. Morris Worth
Attorney, Agent, or Firm—Kolisch, Hartwell, Dickinson

[57] ABSTRACT

A marker for locating an underground object such as a utility line. The marker is attached to a line by wrapping a portion of the marker about the line and inserting an end of the marker through an aperture located between the ends of the marker. A collapsible tongue forming the end of the marker enables the marker to release from the object that it encircles when a tugging force of a certain magnitude is imparted to the marker.

3 Claims, 1 Drawing Sheet

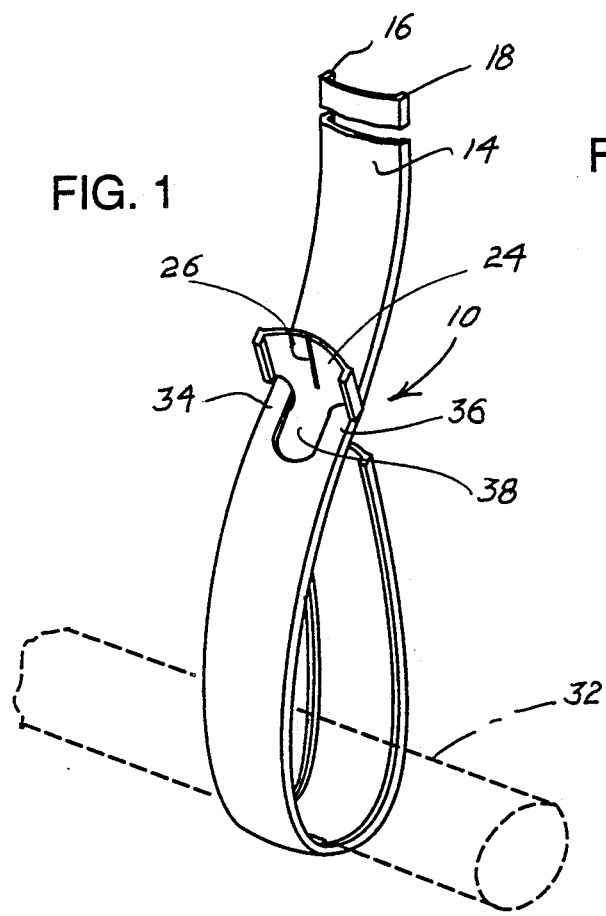
FIG. 1
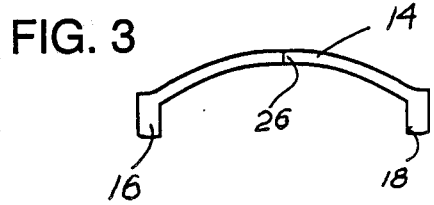
FIG. 3
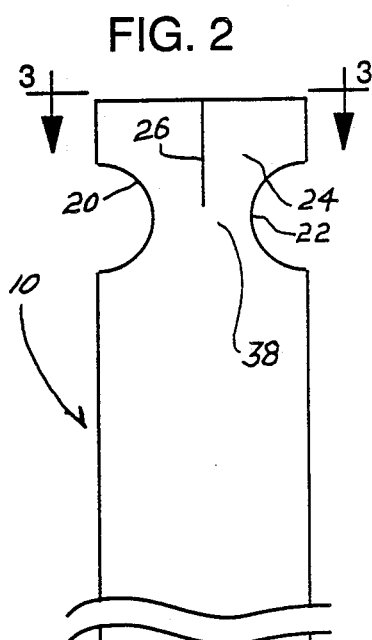
FIG. 2
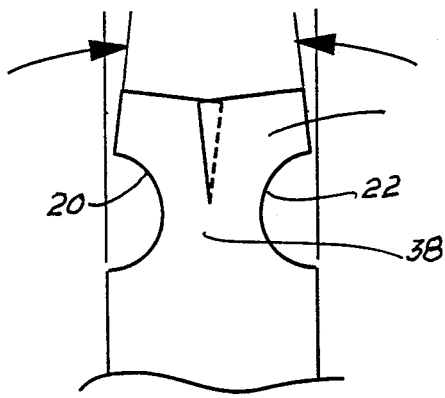
FIG. 4
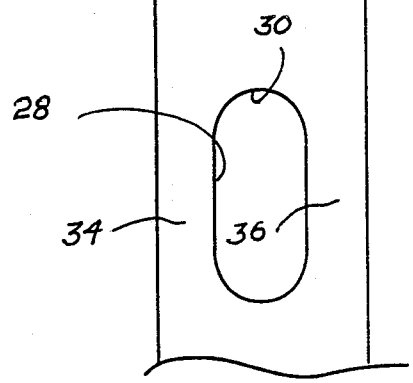

MARKER FOR BURIED OBJECTS

BACKGROUND AND SUMMARY OF INVENTION

This invention relates to a marker adapted to be secured to an object such as a utility line which is adapted to be buried in the ground. The marker after attachment and in following years after burial of the line serves to locate the line.

During the construction of housing units, office buildings, factories, parks, road ways, etc. it is common for a multiplicity of underground objects such as utility lines and the like to be installed. Experience has shown the necessity of ascertaining the location, depth, and direction of these lines at any given time for purposes of safety, final connection with main lines, back filling, recordation for future location, etc. To this end, various marking devices have been developed that include, as does the marker of the present invention, a wrap-around locking strap configuration. Typically markers of this description have been made of a stiff but flexible plastic material, as exemplified by a polycarbonate, a polyethylene, or PVC resins.

A form of marker which is used currently is connected to an underground object such as a utility line by wrapping one end of the marker around the object and securing this end to a mid region of the marker whereby the marker is held in place. The remainder of the marker then extends upwardly from the object to be exposed above the surface of the ground after back filling and burying of the object. A problem that has arisen with such a marker is its inability to release the buried object when and in the event that the free end of the mark is subjected to a sharp tugging force above a certain magnitude. Further explaining, it is desired that the marker not release from an object with light tugging, such as might result from the action of vandals. However, with a sharp pulling force exerted on the marker, as might result from the marker being caught by excavating machinery working in the area, if the marker does not release, this could result in displacement, breaking, or other damage to the line being marked, causing probable disruption of service and requiring expenditure of time and money in repairing the damage done.

Accordingly, it is an object of this invention to provide a marker which is connectable about an underground object, such as a utility line, and which has a construction which enables the marker to release itself from the buried object when a force of a given magnitude is exerted on the free end of the marker.

More particularly, an object is to provide such a marker which has a collapsible tongue forming an end of the marker, this tongue passing through a locking aperture when securing the marker to a line. The construction holds the marker about a buried object with detachment prevented at low force levels. With a tugging force exerted on the free end of the marker which is above a certain level, the tongue described collapses, which frees the end of the marker to pass through the locking aperture, with the result that the marker is released from the line.

The marker is conveniently made from conventional thermoplastic resins. The collapsible tongue described is easily produced by slitting the body of the marker inwardly from an end to produce portions that are displaceable toward each other to effectuate release.

These and other objects and advantages are attained by the invention, which is described hereinbelow in conjunction with the accompanied drawings, wherein:

FIG. 1 is a perspective view of a marker constructed as contemplated and showing the marker with an end thereof wrapped around a line;

FIG. 2 is a plan view, on a slightly larger scale, illustrating an end portion of the marker;

FIG. 3 is an end view of the marker, taken generally along the line 3—3 in FIG. 2; and FIG. 4 illustrates how a collapsible tongue portion in the marker collapses to effectuate release.

Referring now to the drawings, the marker has been given the general reference numeral 10 and takes the forms of an elongate ribbon-like body 12 which may be prepared from an extrusion of a plastic such as a polycarbonate, a polyethylene, or a polyvinylchloride resin. The body has a sufficient length to enable it to be wrapped around the object to be identified and to extend upwardly from this wrapping to the surface of the ground. Typically, the body might have a length ranging from 50 to 80 inches but obviously other lengths can easily be produced.

The body may be prepared with a central expanse 14 which curves slightly extending from one side margin of the body to its opposite side margin. Flanges extending the length of the body and shown at 16 and 18 serve to impart desired stiffness and lateral rigidity.

Illustrated at 20 and 22 are a pair of opposed indents in opposite margins of body 12 located in a region adjacent but spaced inwardly slightly from one end of the body. The indents specifically take the form of semicircular cutouts. Separating the indents is ribbon position 38.

A terminal portion 24 of body 12 extends from the upper end as illustrated in FIG. 2, to the region of cutouts 20, 22. Extending longitudinally of the body and dividing this portion into two segments is a division or slot 26.

Also formed in body 12 between the ends of the body is an elongate aperture shown at 28. Rounded ends, such as end 30, form the ends of the aperture. An each side of the aperture are expanses 34, 36.

In use, the marker is mounted to extend about an object such as the utility line shown at 32 in FIG. 1. This is done by reversely turning on itself the end of the marker which includes the collapsible tongue portion. This tongue portion is then threaded through the aperture The indents then define a seated position for the end of the body with expanses 34, 36 on either side of aperture 28 extending through respective ones of the cutouts. The ribbon of material 38 which separates the cutouts seats adjacent a rounded end of aperture 28.

The mounting for the end of the marker body described provides a relatively secure connection preventing detachment of the mark with only a slight tugging force exerted to the free end of the marker. However, in the event the a force of significant magnitude is applied to the free end of the marker, the end having the collapsible tongue detaches enabling the marker to be pulled free without any damage to line 32. This freeing of the marker end is the result of the tongue portion collapsing as shown in FIG. 4 with shifting to incline positions of the edges of the indents which rest on expanses 34, 36. Further, by reason of the rounded end of the aperture, this collapsing may be accompanied with slight skewing of the marker end within the aperture seating it. The net result is that at a certain force level the end of the marker pulls free of its mounting. By changing the length of division 26, the level of applied force producing collapsing of the tongue may be adjusted.

While a specific embodiment has been described various and modifications of the invention are possible.

It is claimed and desired to secure by Letters Patent:

1. A marker for locating an underground object comprising:
    a flexible, elongate plastic body having an aperture therein located between opposite ends of said body,
    a pair of opposed indents in opposite margins of said body adjacent but spaced inwardly from one end of said body and a terminal portion of said body extending from said one end along the body toward said indents,
    a division in said body extending from said one end along said terminal portion to a position between said indents to produce side-by-side segments in said terminal portion which are movable to partially overlap with distortion of the indents thus to produce collapsing of the terminal portion,
    said aperture accommodating the passage therethrough of said terminal portion with the body reversely turned on itself and said indents defining a seated position for said body within said aperture, the terminal portion permitting the indents to deform to enable the terminal portion to be retracted through the aperture in response to a displacement force being exerted thereon.

2. The marker of claim 1, wherein said indents are semicircular in shape.

3. The marker of claim 1 or 2, wherein said indents are separated by a ribbon of material and wherein said aperture has a rounded end and said ribbon of material seats against said rounded end.

* * * * *